Patented May 10, 1949

2,469,726

UNITED STATES PATENT OFFICE 2,469,726

DESULFURIZATION OF TRI-ISOBUTYLENE

William G. Hockberger, Baton Rouge, La., assignor to Standard Oil Development Company, a corporation of Delaware No Drawing. Application September 6, 1946, Serial No. 695,279

4 Claims. (Cl. 260—677)

This invention relates to the purification of tri-isobutylene and more particularly relates to the removal of sulfur from tri-isobutylene prior to hydrogenation.

In order to reduce the hazard from fire which is attendant to the crash landing of aircraft, it has been proposed that the customary flammable gasoline used as fuel be replaced by a material which will not readily ignite at atmospheric temperature, yet will perform satisfactorily in an internal combustion engine of the conventional Otto type. The requirements for such a fuel are that it be substantially equal in antiknock quality and heating value to conventional high octane number aviation gasolines, yet have a "flash point" high enough so that its vapors will not readily ignite from a spark under atmospheric conditions. A fuel having a Tag closed cup flash point of at least 100° F. may be properly designated a "safety fuel."

Such a fuel may be prepared by polymerizing isobutylene by means of sulfuric acid and hydrogenating the polymer obtained. However, difficulty is encountered in the hydrogenation step if the polymerized isobutylene or "trimer" is not carefully purified to remove sulfur. While the hydrogenation can be carried out with a sulfur-resistant catalyst, such as molybdenum sulfide deposited on charcoal, high temperatures and pressures are required as a result of which a substantial portion of the trimer is cracked back to isobutylene. On the other hand, a sulfur-sensitive catalyst, such as nickel, can be used at lower temperatures at which cracking does not occur. It is evident, therefore, that it is important to remove sulfur from the trimer prior to hydrogenation.

It is, therefore, the main object of this invention to provide a method for removing sulfur from trimer before hydrogenation with sulfur-sensitive catalysts.

According to the present invention this object can be accomplished by contacting the tri-isobutylene with relatively fine mesh silica gel. In the practical application of this invention, the trimer is contacted at ordinary temperatures with 28–200 mesh silica gel. The method of contact between the trimer and the silica gel is of critical importance, and satisfactory desulfurization is achieved by percolating the trimer through a layer of silica gel of sufficient thickness to substantially ensure the desired adsorption. Simply mixing fine mesh silica gel with trimer in a tank is unsatisfactory as demonstrated by the following data:

| Tri-isobutylene | Sulfur, Wt. Per Cent |
|---|---|
| Untreated | 0.0124–0.0122 |
| Treated by agitation with silica gel in a tank: | |
| 20 lb. gel/bbl | 0.0118–0.0119 |
| 75 lb. gel/bbl | 0.0041–0.0044 |

In all cases, care should be taken that the silica be regenerated or revivified as soon as its adsorptive capacity has been saturated.

It is, of course, understood that the method according to this invention is not limited to the desulfurization of tri-isobutylene since any other isobutylene polymer or copolymer may be desulfurized in like manner. Since it is essential to have a sulfur content below 0.0005 wt. per cent and preferably below 0.0001 wt. per cent when hydrogenating trimer over sulfur-sensitive catalysts, it is desirable to remove as much sulfur as possible by a preliminary distillation to remove the light and heavy ends and then treat the middle cut (boiling 300°–400° F.) with silica gel in order to minimize the proportions of silica gel required. The manner of fractionating the polymer is important relative to the sulfur content of the 300°–400° F. fraction. For example, a still having a capacity of two gallons and 25 theoretical plates yielded a sulfur content, when employing a reflux ratio of ten to one of 0.01 wt. per cent while a fifty gallon still with only ten theoretical plates and a ten to one reflux ratio gave a 300°–400° F. cut having a sulfur content of 0.04 wt. per cent. The sulfur content of a trimer fraction is also affected by the sulfur content of the isobutylene feed to the polymerization and by the polymerization conditions and it is intended that a low-sulfur trimer should be produced initially to reduce the load on the silica gel.

The following examples are given to indicate the general character of the treating effects obtainable in the practical application of this invention and while they are illustrative, they are not given with the intent of limiting the scope of the invention to the specific instances cited.

The following table illustrates the effectiveness of the process of this invention.

| | Sample | Sulfur, Wt. Per Cent |
|---|---|---|
| 1 | Untreated Trimer | 0.0195 |
| 2 | After percolation through 75 lbs. of 28–200 mesh silica gel per bbl. of trimer | 0.0015 |
| 3 | After percolation through 150 lbs./bbl. silica gel | 0.0003 |
| 4 | After percolation through 300 lbs./bbl. silica gel | 0.0002 |
| 5 | After percolation through 600 lbs./bbl. silica gel | 0.0001 |

While it is known that the sulfur content of various petroleum fractions may be reduced by percolation through silica gel, the reduction in sulfur content with an amount of silica gel which is commercially attractive is not sufficient to allow a sulfur sensitive catalyst to be used for a subsequent hydrogenation step. However, when tri-isobutylene is thus treated an unexpectedly large amount of sulfur is removed with a considerably smaller amount of silica gel as shown in the following table.

| Lb. Silica Gel/bbl. oil | Sulphur (wt. percent) | | Percent Sulphur Removal | |
|---|---|---|---|---|
| | Trimer | East Texas Heavy Naphtha | Trimer | Naphtha |
| 0 | 0.0193–0.0198 | 0.0050–0.0053 | | |
| 40 | | 0.0030 | | 40 |
| 75 | 0.0015–0.0016 | | 92 | |
| 100 | | 0.0015–0.0016 | | 70 |
| 150 | 0.0003–0.0004 | | 98 | |
| 300 | 0.0002 | 0.0004 | 99 | 90 |

The above data show that, although the trimer contains almost four times as much sulfur as naphtha, it takes half as much silica gel to desulfurize trimer to 0.0004 wt. per cent sulfur as to desulfurize East Texas naphtha to the same sulfur content. Furthermore, 98% of the sulfur is removed from the trimer with only 150 lbs. of silica gel while twice as much gel removes only 90% of the sulfur from the naphtha.

The following example indicates how fractionation may be combined with silica gel desulfurization to reduce the sulfur content of a tri-isobutylene stock to be hydrogenated to a point where sulfur sensitive catalysts may be used and at the same time keep the amount of silica gel within economical limits (10–20 lbs. silica gel per bbl. of tri-isobutylene).

Tri-isobutylene containing 0.0030 wt. per cent of sulfur was fractionated in a ten plate column with a 10/1 ratio and a middle cut containing 0.0007 wt. per cent sulfur was percolated through silica gel as follows:

| Lbs. Silica Gel/bbl. of trimer | Sulfur, wt. percent |
|---|---|
| 0 | 0.0007 |
| 20 | 0.0001 |
| 40 | 0.0001 |

The process of this invention may be considered as a clean-up process for use after some other desulfurization process adapted for economically reducing large sulfur contents to relatively small sulfur contents. For example, catalytic desulfurization over a copper-alumina catalyst at 600° F. might be utilized as a first stage process to reduce sulfur content from 0.02 wt. per cent down to 0.002 wt. per cent; silica gel could then be used to reduced the sulfur content on down to less than 0.0002 wt. per cent sulfur.

The features and advantages of the present invention are obvious from the consideration of the preceding specification and numerical data presented, although neither should be construed as imposing undue limitations upon the broad scope of the invention.

The nature and objects of this invention having thus been set forth and specific examples of the same given, what is claimed as new and useful and desired to be secured by Letters Patent is:

1. A process for removing sulfur from tri-isobutylene comprising fractionating crude tri-isobutylene containing sulfur into three fractions and percolating the middle cut through 10–20 lbs. of 28–200 mesh silica gel per bbl. of tri-isobutylene, whereby the sulfur is substantially completely removed.

2. Process according to claim 1 in which the middle cut has a boiling range of about 300° to 400° F.

3. A process for removing sulfur from polymerized isobutylene, comprising fractionating the said polymerized isobutylene into 3 fractions and percolating the middle cut through about 10–20 lbs. of 28–200 mesh silica gel per barrel of polymerized isobutylene.

4. In a process for removing sulfur from polymerized isobutylene by adsorption with silica gel, the improvement which comprises first fractionating said polymerized isobutylene into at least 3 fractions and percolating the middle fraction through silica gel.

WILLIAM G. HOCKBERGER.

REFERENCES CITED

The following references are of record in the file of this patent:

UNITED STATES PATENTS

| Number | Name | Date |
|---|---|---|
| 2,310,375 | Rummelsburg | Feb. 9, 1943 |
| 2,394,678 | Frankel et al. | Feb. 12, 1946 |
| 2,398,101 | Lipkin | Apr. 9, 1946 |
| 2,405,905 | Schindler | Aug. 13, 1946 |